United States Patent
Collins, Jr. et al.

(10) Patent No.: US 9,410,841 B2
(45) Date of Patent: Aug. 9, 2016

(54) INTEGRATED SCANNER, SCALE, AND TOUCHSCREEN DISPLAY

(75) Inventors: Donald A. Collins, Jr., Buford, GA (US); Peter B. Barron, Tucker, GA (US); Graeme Smith, Dundee (GB)

(73) Assignee: NCR Corporation, Duluth, GA (US)

( * ) Notice: Subject to any disclaimer, the term of this patent is extended or adjusted under 35 U.S.C. 154(b) by 158 days.

(21) Appl. No.: 13/435,430

(22) Filed: Mar. 30, 2012

(65) Prior Publication Data

US 2013/0256041 A1    Oct. 3, 2013

(51) Int. Cl.
| G01G 19/40 | (2006.01) |
| G01G 19/414 | (2006.01) |
| G01G 23/36 | (2006.01) |
| G07G 1/00 | (2006.01) |
| G07G 1/12 | (2006.01) |
| A47F 9/04 | (2006.01) |

(52) U.S. Cl.
CPC .......... *G01G 19/4144* (2013.01); *G07G 1/0045* (2013.01); *G07G 1/12* (2013.01); *A47F 9/047* (2013.01)

(58) Field of Classification Search
CPC ... G01G 21/28; G01G 19/52; G01G 19/4144; G06K 7/10544; G06K 15/00; G06Q 30/0641; G06Q 30/0643; G06Q 50/10; G06Q 50/12; G06Q 20/208; G06Q 20/20; G07G 1/0072; G07G 1/12; G07G 1/0045; G07G 1/0054; G06F 3/01; G06F 1/1684; G06F 3/0421; G06F 3/0425; G06F 2203/04105; G06F 1/16; G06F 3/042; A47F 9/047
USPC .............. 177/25.11–25.15; 235/383; 702/173
See application file for complete search history.

(56) References Cited

U.S. PATENT DOCUMENTS

| 5,750,937 | A   | * | 5/1998  | Johnson et al. ............ 177/25.11 |
| 6,550,582 | B2  |   | 4/2003  | Addy et al. |
| 6,644,547 | B1  | * | 11/2003 | White .................... G06Q 20/04 235/381 |
| 7,186,930 | B1  | * | 3/2007  | Wong et al. ................ 177/25.13 |
| 7,547,851 | B1  | * | 6/2009  | Wong .......................... 177/25.13 |
| 7,681,794 | B2  | * | 3/2010  | Leng .................... G06F 1/1616 235/454 |
| 7,681,795 | B2  |   | 3/2010  | Roquemore |
| 8,169,332 | B2  | * | 5/2012  | Son ............................... 340/665 |
| 8,448,859 | B2  | * | 5/2013  | Goncalves et al. .......... 235/383 |
| 8,610,007 | B2  | * | 12/2013 | Chen ......................... 177/25.13 |
| 9,092,050 | B2  | * | 7/2015  | Amada ..................... G06F 3/01 |
| 2002/0079168 | A1 |  | 6/2002  | Addy et al. |
| 2003/0120547 | A1 |  | 6/2003  | Walter et al. |

(Continued)

OTHER PUBLICATIONS

Office Action for European Patent Application No. 13156592.1-1557 dated Jul. 9, 2013.

(Continued)

*Primary Examiner* — Randy W Gibson
(74) *Attorney, Agent, or Firm* — Schwegman, Lundberg & Woessner (57) ABSTRACT

An integrated scanner, scale and touchscreen display ("integrated touchscreen scanner") is addressed. In one alternative, the integrated touchscreen scanner further includes a printer for printing receipts, coupons and the like. The integrated touchscreen scanner is designed for flush mounting in a checkout or self-checkout stand. Keystrokes, icon selection and the like may be suitably sensed employing weigh cells in the scale of the integrated touchscreen scanner. Additionally, the display may be partitioned into a customer portion and a checker portion. This partitioning may be fixed or dynamically adjusted in response to the state of the transaction.

12 Claims, 9 Drawing Sheets

(56) References Cited

U.S. PATENT DOCUMENTS

| | | | |
|---|---|---|---|
| 2004/0003947 A1* | 1/2004 | Kesselman et al. | 177/25.13 |
| 2012/0181091 A1* | 7/2012 | Lieu | 177/1 |
| 2012/0193407 A1* | 8/2012 | Barten | 235/375 |
| 2013/0063920 A1* | 3/2013 | Farahani | G06F 1/1637 361/807 |
| 2013/0320084 A1* | 12/2013 | Amada | G06F 3/01 235/383 |
| 2014/0020961 A1* | 1/2014 | Luo et al. | 177/25.15 |
| 2014/0089231 A1* | 3/2014 | Jhunja et al. | 705/407 |
| 2014/0209675 A1* | 7/2014 | Collins et al. | 235/383 |
| 2014/0224551 A1* | 8/2014 | Turner | 177/1 |
| 2015/0074581 A1* | 3/2015 | Dyer et al. | 715/771 |
| 2015/0179026 A1* | 6/2015 | Skiles | G07G 1/0072 |

OTHER PUBLICATIONS

Thornwood. "Combination Keypad/Scale Using Strain Gauge Transducers." IBM Technical Disclosure Bulletin, International Business Machines Corp. vol. 34, No. 9, Feb. 1, 1992, pp. 77-78.

IBM Technical Disclosure Bulletin vol. 34 No. 9. Feb. 1992. pp. 77-78.

\* cited by examiner

INTEGRATED SCANNER, SCALE, AND TOUCHSCREEN DISPLAY

FIELD OF THE INVENTION

The present application relates generally to aspects of improvements to checkout and self-checkout, and more particularly, to advantageous aspects of a combined scanner and scale which also integrates a touchscreen and display.

BACKGROUND OF THE INVENTION

Various integrated scanner scale arrangements are well known in the art. See, for example, U.S. Pat. Nos. 6,536,668 and 7,997,493 assigned to the assignee of the present application which are incorporated by reference herein in their entirety. Such integrated units are highly advantageous and have been widely adopted in grocery stores, large box retailers and the like. In these approaches, the weigh plate includes a transparent window through which a scanner unit scans. Because the environment is harsh in the sense that can rims, glass bottle bottoms, grit and the like are rubbed against the transparent surface on an ongoing and repetitive basis, a glass weigh plate or scanning window gets scratched and needs to be replaced. As a result, diamond coated glass or glass with a sapphire laminate is typically employed. These coating approaches are not presently compatible with a clear bright display. Further, as a result of this scratchy environment, approaches to building a touchscreen display into the scanner scale arrangement such as resistive or capacitive touch sensing approaches are not sufficiently robust. In a typical resistive approach, two thin, transparent electrically resistive layers are separated by a thin gap. When the top layer is pressed down a connection is made at the point its bottom surface touches the top surface of the bottom layer. The thin top layer is not sufficiently impervious to scratching. In a typical capacitive approach, a glass screen is coated with a transparent conductor such as indium tin oxide. Touching this surface changes the capacitance and the change can be analyzed to locate the location of the touch. Again, a suitable transparent conductor coating, such as indium tin oxide, is not sufficiently robust.

Figure 1:
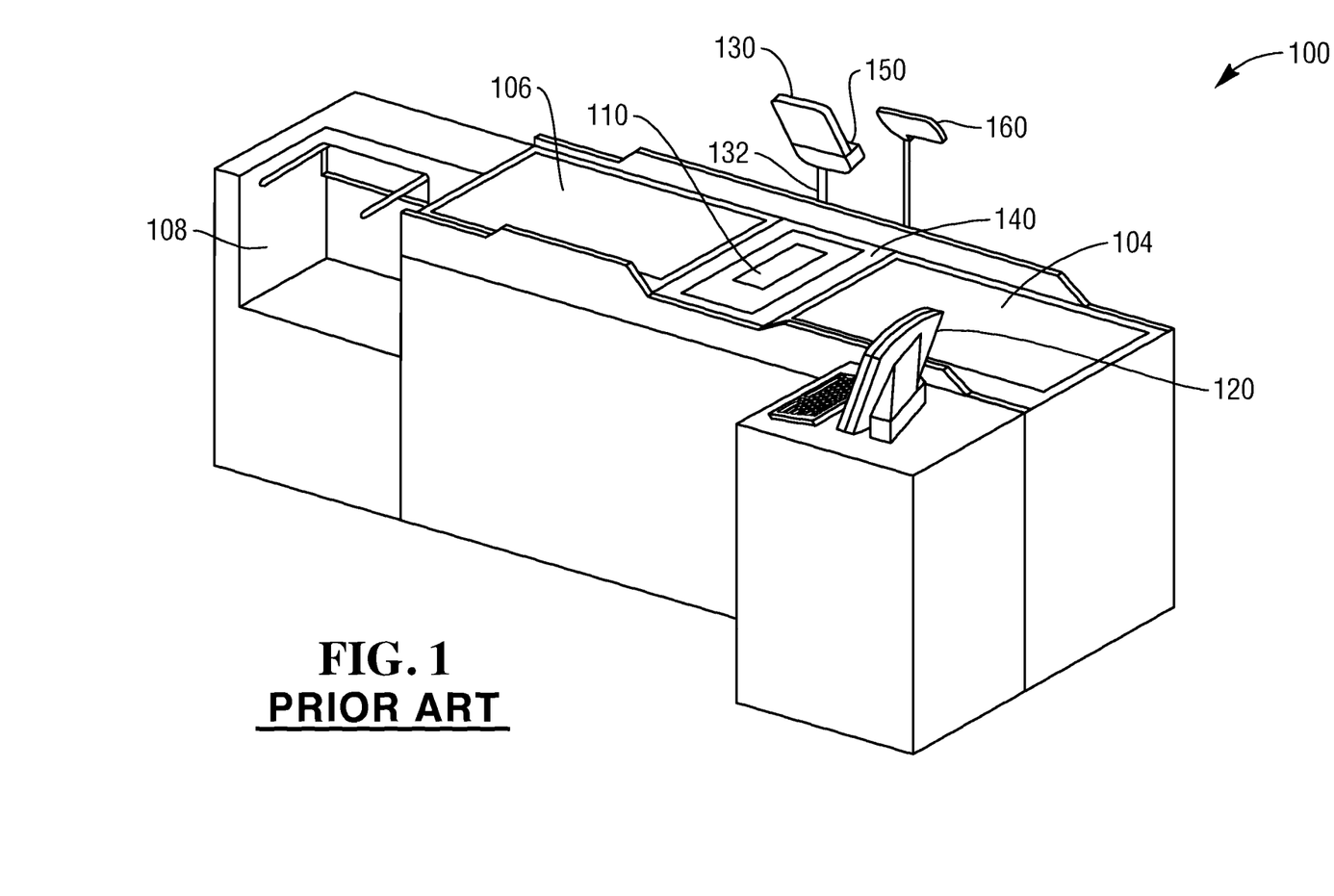
FIG. 1 illustrates a prior art checker assisted checkout stand.

One exemplary prior art checkout stand or system 100 for checker assisted checkout using such an integrated scanner and scale flush mounted with a top surface of the checkout stand is shown in FIG. 1. As seen in FIG. 1, a customer wishing to checkout goes to a checker assisted checkout stand 100 comprising a first section of product advancing belt 104, an integrated scanner scale 110, a second section of product advancing belt 106, a bagging area 108, and a point of sale (POS) terminal 120.

Items are removed from a shopping basket or cart and placed on the belt 104 by the customer. The items are removed from the belt by the checker who scans bar codes on the items having bar codes utilizing the scanner of the scanner scale 110. Items that have been scanned are then placed on belt 106 which advances them to bagging area 108. Items to be weighed are placed on the weigh plate of the scanner scale 110, and weighed utilizing the scale of the scanner scale 110.

The checkout stand 100 further comprises a card reader 130 mounted on a pole 132. Card reader 130 may be utilized by the customer to read a magnetic stripe on a credit card used to pay for the customer's purchase. A coupon and receipt printer 150 may be integrated into the card reader 130, or a separate printer may be utilized, as well as, a display 160 to display a running list of items and prices, as well as, the total price for the customer's checked out items. It will be recognized a great many variations on the arrangement of FIG. 1 have been employed.

Figure 2:
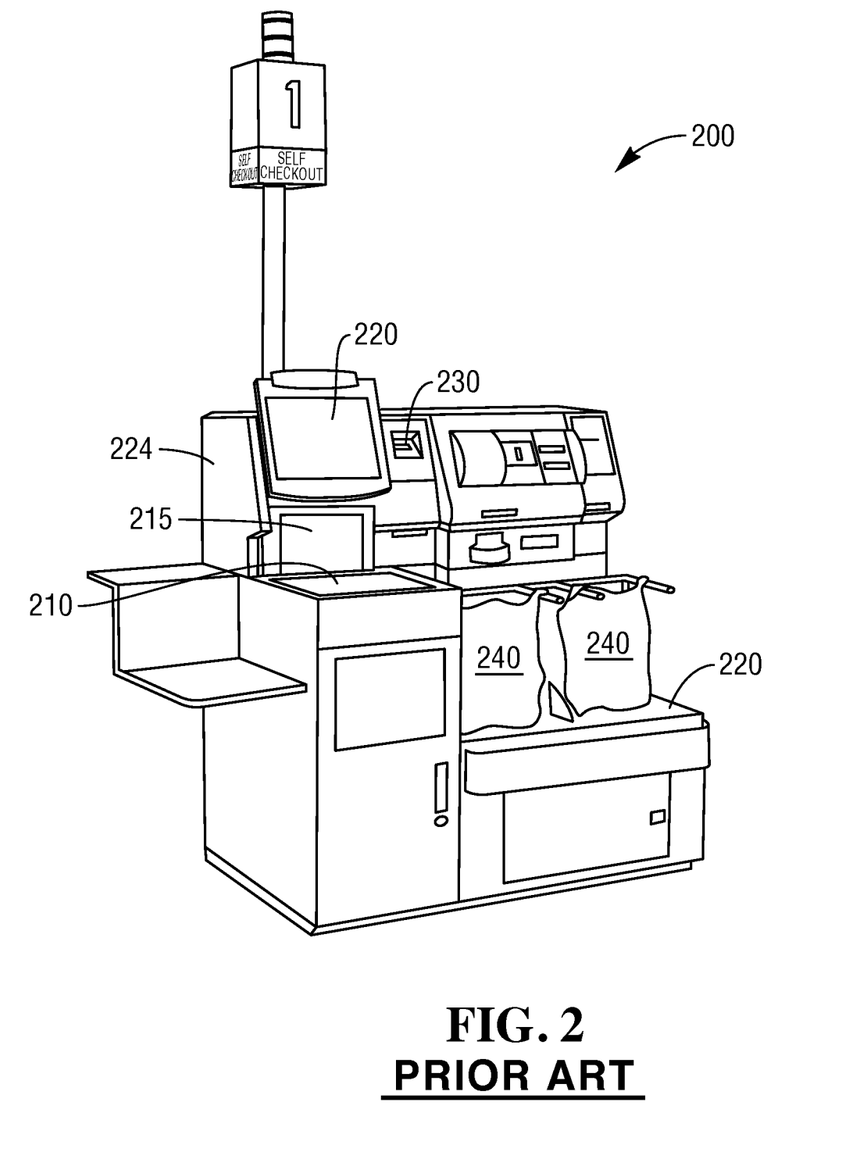
FIG. 2 illustrates a prior art self-checkout system.

An exemplary checkout stand 200 for self-checkout is shown in FIG. 2. One known self-checkout terminal 200 used in a supermarket setting is depicted in FIG. 2. The terminal 200 includes integrated scanner scale 210 including a product weigh scale and a scanner associated with the scale. The illustrated scanner includes a vertical scan window 215. A bagging scale 220 is provided adjacent the scanner to support grocery bags 240 into which the customer places each newly scanned item. Each of the scales include at least one weight detector, such as a pressure sensor or a load cell sensor, which is operable to generate a signal in response to the weight of the item or items placed on the scale. The checkout stand 200 also includes a touchscreen, such as a magnetic stripe reader for reading a credit card, including touchscreen display 232, a data input device, and a payment device 230. A computer or processor is resident within the terminal and executes various software routines associated with the self-checkout process. Again, it will be recognized that a great many variations on the arrangement of FIG. 2 have been employed.

SUMMARY OF THE INVENTION

Among the several aspects of the present invention, the inventors have realized that one disadvantage of an arrangement like the checkout system 100 of FIG. 1 is that in situations where a bar code cannot be read using the integrated scanner and scale 110, the checkout operator typically turns away from the customer and the goods being purchased, and enters the data manually using the POS terminal 120. Then, the checker or cashier turns back to the task of completing the scanning of the customer's items. Such an approach interrupts the flow of checkout and slows the checkout process.

As addressed in further detail below, one aspect of the present invention provides an integrated touchscreen display as part of the scanner and scale allowing the checkout person to pay better attention to the customer, and to perform a more ergonomic and simpler checkout flow. This touchscreen in one embodiment employs a replaceable glass weigh plate, and is sufficiently robust to meet the rigors of the checkout environment.

The inventors have further realized that the various needs to collect customer inputs and to provide desired customer outputs are not being met as cost effectively, aesthetically or simply as desirable. For example, customer credit card data may be collected by a credit card swipe device, such as the card reader 130 mounted on the pole 132 extending upward from the checkout counter top surface 140 of FIG. 1. Customer coupons may be printed using the printer 150, that may be integrated with card reader 130 or separately located elsewhere as part of the checkout stand 100. A separate display, such as display 160, may be provided to display the total price for the customer's checked out items as shown in FIG. 1, for example. Such devices are subject to wear and tear, block a clean line of sight, require additional electrical wiring, and result in additional cost to the overall system. Aspects of the present invention provide an approach for simplifying the overall checkout stand.

Similarly, in the context of self-checkout, a customer may scan an item looking down at an integrated scanner scale such as the scanner scale 210 of FIG. 2, then look up at touchscreen display 220 to see an instruction or enter a selection. One aspect of the present invention eliminates the need for a separate touchscreen display, and also avoids this looking up and then down, simplifying self-checkout.

According to another aspect of the present invention, the touchscreen display of the integrated scanner scale of the invention can be utilized to advantageously display information to the customer. By employing multi-touch detection and partitioning the touchscreen, both the customer and checkout operator can simultaneously utilize the same touchscreen display. In one embodiment, a printer may also be integrated into the scanner, scale, and touchscreen display unit to print a receipt, customer coupons, other customer offers, and the like.

A more complete understanding of the present invention, as well as further features and advantages of the invention, will be apparent from the following Detailed Description and the accompanying drawings.

DETAILED DESCRIPTION

Figure 3:
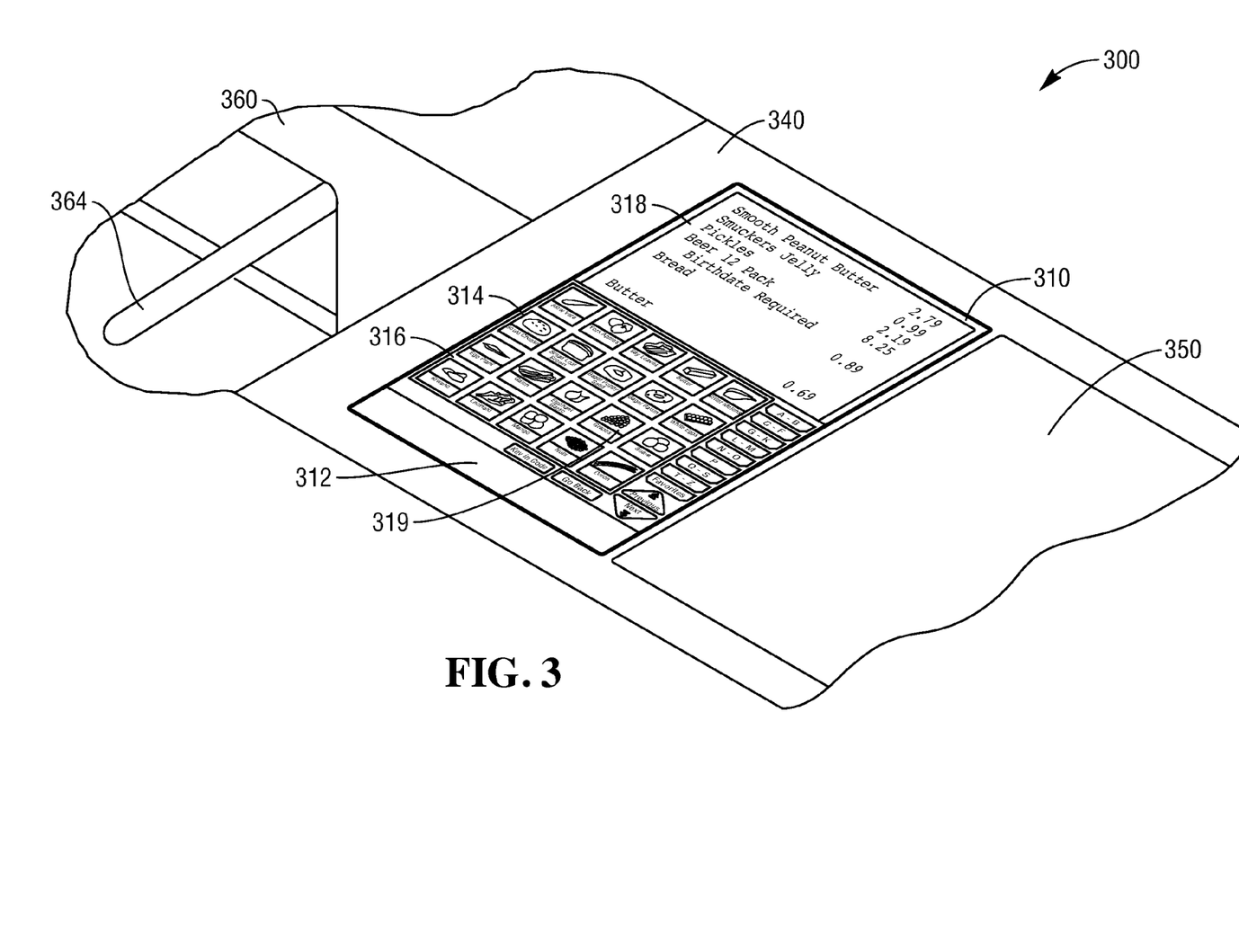
FIG. 3 illustrates a first embodiment of a checkout system employing a scanner, scale, touchscreen display in accordance with the present invention.

FIG. 3 shows a checkout stand 300 employing a scanner, scale, and touchscreen display ("integrated display scanner") 310 in accordance with the present invention. The integrated display scanner 310 is mounted so that its top surface 312 is mounted substantially flush with top surface 340 of checkout stand 300. From a checker's point of view, to the right of the integrated display scanner 310, there is a belt transport 350 and, to the left, there is a bagging carousel 360. In operation, a customer places items to be purchased on the belt 350, the checker or cashier takes them and scans them utilizing the bar code scanner of integrated display scanner 310 and then bags the scanned item in a bag (not shown) held by a rack or racks (only one rack 364 shown in FIG. 3 as much of the checkout stand in FIG. 3 is shown cutaway to better focus on and illustrate the display of the integrated display scanner 310) of a bagging arrangement in the bagging area 360. In the FIG. 3, the touchscreen display and the weigh plate of the integrated display scanner have been combined in a single weigh plate and touchscreen 314.

If an item cannot be scanned, for example, a frozen food item having frost on it, produce or other items lacking bar codes, or for an item that has a damaged bar code, or for any other reason, no bar code can be read; the checker, rather than turning to face a separate POS terminal, such as the POS terminal 120 of FIG. 1, may suitably employ the touchscreen display 314 of the integrated display scanner 310 to enter the necessary information, for example by keying in the universal product code number for the item utilizing a keypad displayed by the touchscreen display 314.

As seen in FIG. 3, the touchscreen display 314 has been partitioned into a checker portion 316 and a customer portion 318. In the checker portion 316, a menu is displayed, with icons for grapes, mangoes, and other items of produce, as well as, other items which are sold by weight. Other high velocity items, such as a Sunday paper, may have an icon or key so that the item can be checked without scanning by simply selecting the key.

To weigh an item, such as grapes, the checker selects the grapes icon 319 on the touchscreen, and places the grapes on the weigh plate and touchscreen (weigh plate/touchscreen 314), and the scale of the integrated display scanner 310 weighs it. The weight and price are then multiplied to obtain the sales price which is added to the customer order in a known fashion. Other items with bar codes are simply scanned by the checker, and the POS system which may be further integrated into the integrated display scanner 310 if desired obtains their prices and compiles a customer receipt and running price total.

As mentioned above, and as addressed further below, during checkout, the display of the integrated display scanner 310 may be divided into the checker portion 316 and the customer portion 318, as illustrated in FIG. 3. Thus, for example, while the checker is scanning and weighing items, the customer portion 318 of the touchscreen display may be utilized to display the customer's receipt as shown in FIG. 3. Alternatively, advertising and promotions, a guide page to guide the customer in steps such as utilizing a coupon on a phone or presenting a credit card for payment, presenting a driver's license for age restricted items or a charge, loyalty card, or the like, to allow a child to play a short game, or any customer to engage in a promotional contest, or the like. The possibilities are many given the flexibility of the present invention. Because the display is preferably color and can be formatted like an iPhone™, iPad™, Droid™ or the like with a familiar look, feel and touchscreen, the approach may be expected to be readily accepted and adopted by customers, many of whom will find its usage highly intuitive based upon their usage of other devices that are familiar to them, and thus may simplify the checkout process for such users, thereby speeding checkout.

Figure 4A:
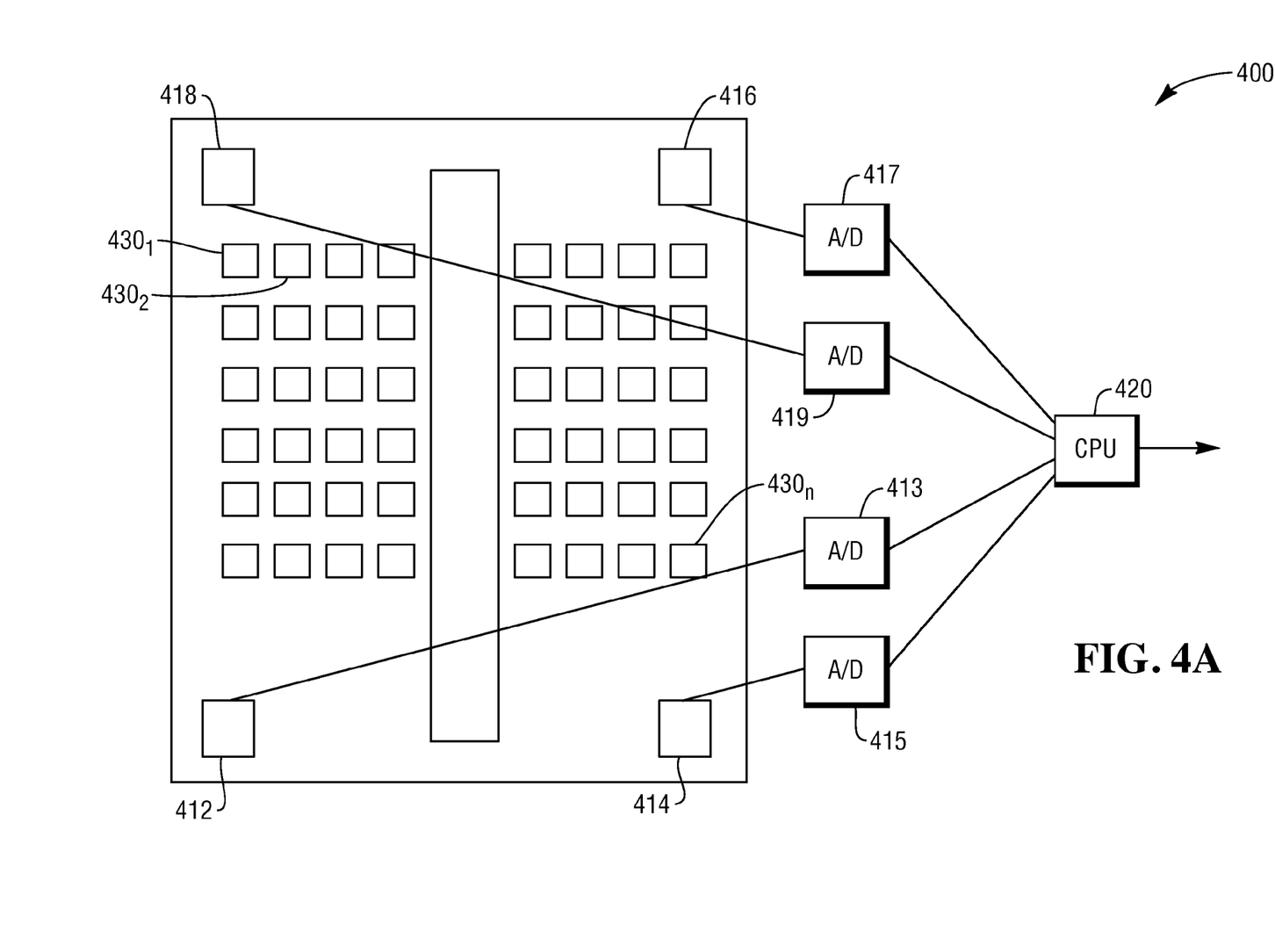
FIG. 4A shows a block diagram of a system to detect touch sensing suitable for use in conjunction with the checkout system of FIG. 3.

FIG. 4A illustrates a first system 400 which may be suitably employed to sense multiple touches of a touchscreen display, such as the touchscreen display 314 of FIG. 3, by customers and checkers in accordance with the present invention. In FIG. 4A, a plurality of load cells 412, 414, 416 and 418 are located beneath the corners of the combined weigh plate and touchscreen. The load on each load cell causes an analog signal to be provided which is sensed by a respective analog to digital converter (A/D) 413, 415, 417 and 419 which produces a digital output. The four digital outputs are provided to a central processing unit (CPU) 420. The CPU 420 processes these outputs to determine the weight of a produce item or the like being weighed in a known fashion. For further exemplary details, see, for example, U.S. Pat. No. 7,681,795, which is assigned to the assignee of the present application and incorporated by reference in its entirety. The present inventors have realized that a sensing technique like that employed in U.S. Pat. No. 7,681,795 can be adapted by suitably programming the CPU 420 to resolve the location of a touch by a checker and/or a customer at one of the locations $430_1, 430_2 \ldots 430_n$ shown in FIG. 4A.

Figure 4B:
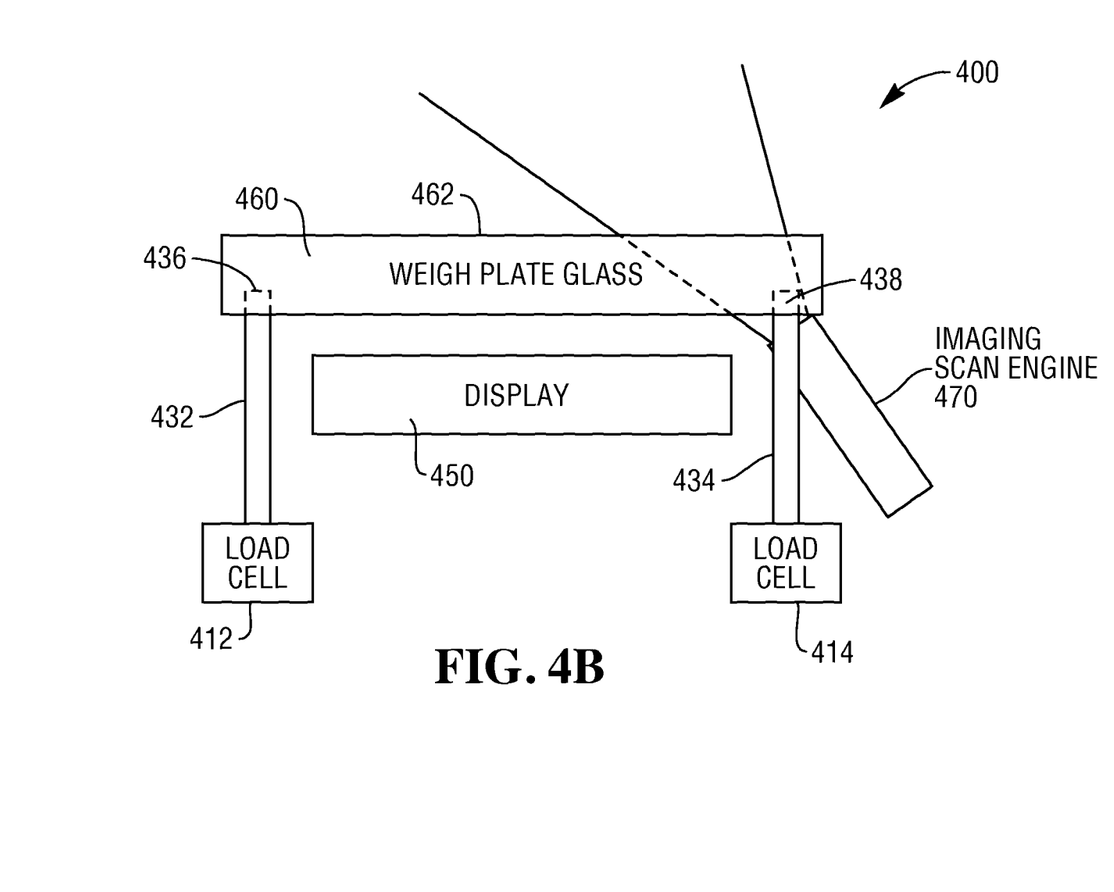
FIG. 4B shows a side view of the system of FIG. 4B illustrating one approach to scanning suitable for use in conjunction with the checkout system of FIG. 3.

FIG. 4B illustrates a side view of the system 400 to illustrate an exemplary scanning approach which may be suitably employed in conjunction with the touchscreen display 314 of FIG. 3. As seen in FIG. 4B, weigh plate glass 460 is supported near its corners by posts 432 and 434, as well as, similar posts near its other corners not seen in FIG. 4B. Posts 432 and 434 transmit load forces to load cells 412 and 414, respectively. A color liquid crystal display (LCD) 450 is arranged beneath the weigh plate. An imaging scan engine 470 is employed to read bar codes passed above the weigh plate glass. While the single imaging scan engine 470 is shown in FIG. 4B, an array of imaging scan engines are suitably employed, for example, two imaging scan engines on each edge of the weigh plate glass. Each scan engine may suitably be implemented by a Honeywell™ IS4920 Image Engine, for example. As seen in FIG. 4B, each imaging scan engine, like imaging scan 470 is arranged to not be blocked by display 450.

To insure proper alignment and seating of the weigh plate glass 460, cups 436 and 438 are cut out or otherwise formed in its bottom surface, and the tops of posts 432 and 434, respectively, are seated therein. Because the diamond coating or sapphire layer are not employed to protect the top surface 462 of weigh plate glass 460, this plate 460 is preferably designed to be readily removed and replaced with a new one when it becomes too scratched.

Where the arrangement of FIG. 4B is employed in a self-checkout system like the one shown in FIG. 2, the image based scanning of the integrated display scanner may further include a vertical laser scan face and scanner as currently seen in FIG. 2. An integral housing or bucket (not shown) houses the components of FIG. 4B and facilitates mounting the top surface 462 of weigh plate glass 460 substantially flush with a top surface of a checkout stand as seen in FIG. 1, for example. Alternatively, imaging scanning like that shown in FIG. 4B may also be supplemented with a top down scanning arrangement mounted above the top plate glass 462.

One advantage of imaging scanning as shown in FIG. 4B is that with proper positioning and angling of the imaging scan engines, an item passed around and not over the weigh plate glass, and consequently not scanned can be sensed so that security measures can be taken. For example, a customer's picture may be taken by a camera.

Figure 5:
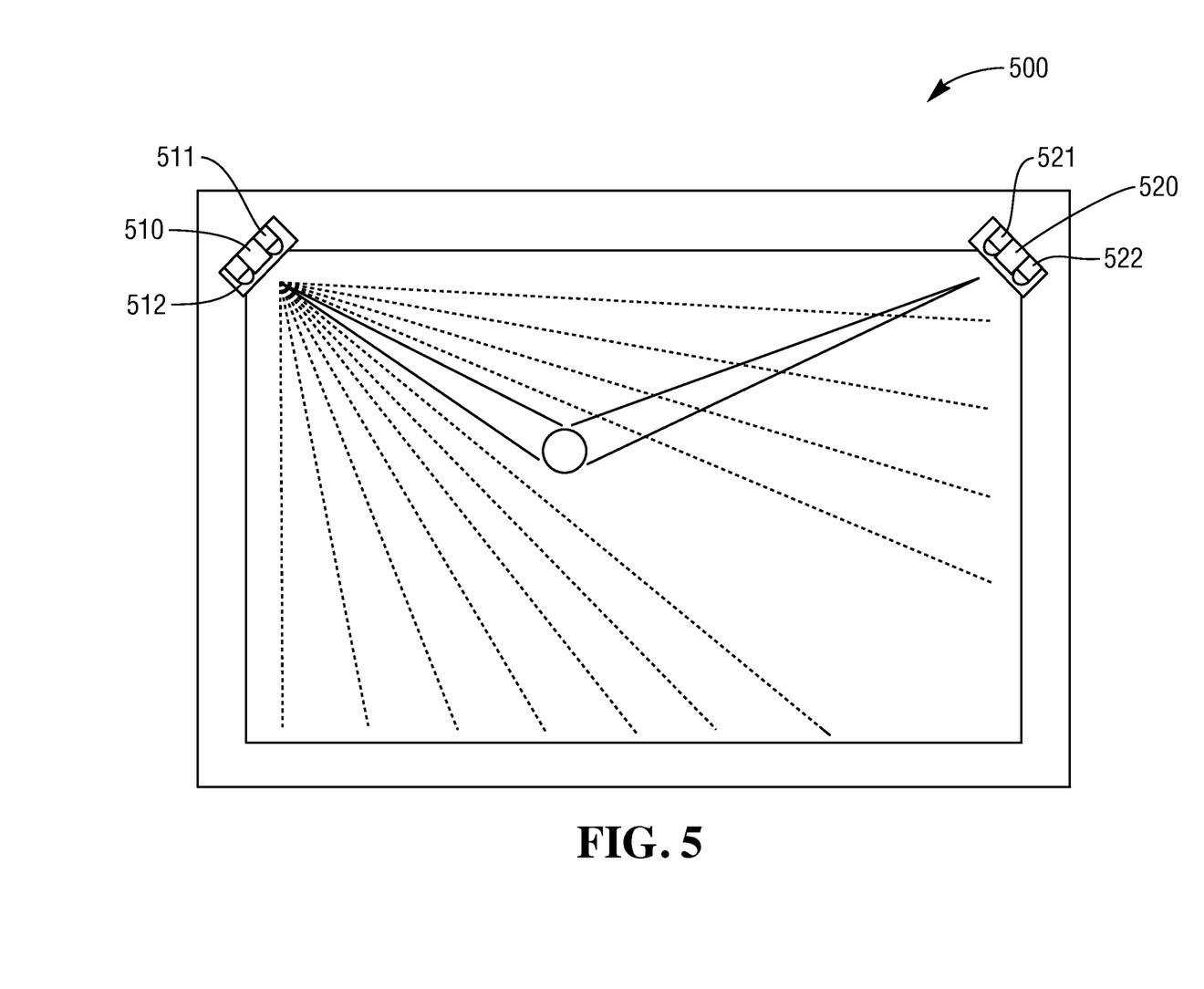
FIG. 5 shows an alternative approach to touch sensing suitable for use in conjunction with the checkout system of FIG. 3.

FIG. 5 illustrates an alternative touch sensing system 500 employing two or more infrared line scanning optical sensors 510 and 520, for example, analogous to the optical scanner already used in the bar code scanner portion of the integrated scanner 300. As shown in FIG. 5, each of the sensors 510 and 520 is mounted in a corner of the touchscreen. The sensors 510 and 520 monitor the complete screen which is illuminated with infrared light.

The infrared illumination of the screen area may be suitably provided by infrared emitting devices (IREDs) 511 and 512, and 521 and 522, positioned in the upper left and right corners, respectively, next to the line scanning sensors, but optically isolated to avoid crosstalk. Each of these IRED assemblies illuminates the complete 90° angular range of the screen. The reflection or blockage occurring as a result of a finger touch triggers a change in the signal of the relevant detector cells. Utilizing computational algorithms, such as triangulation based on the readout of the two line scanning sensors, the coordinates and even size of the touching object or finger-tip can be calculated via suitable software.

Additionally, the infrared signals may be further analyzed to obtain additional data for use in performing produce recognition. See, for example, U.S. Pat. Nos. 6,845,910 and 8,113,427, incorporated by reference herein in their entirety. Provided they are sufficiently robust, additional touch selection techniques may be adapted for use in connection with the present invention as described by "How Carroll Touch Technology Works", copyright 2100 Tyco Electronics Corporation, pages 1-14, incorporated by reference herein in its entirety.

Figure 6:
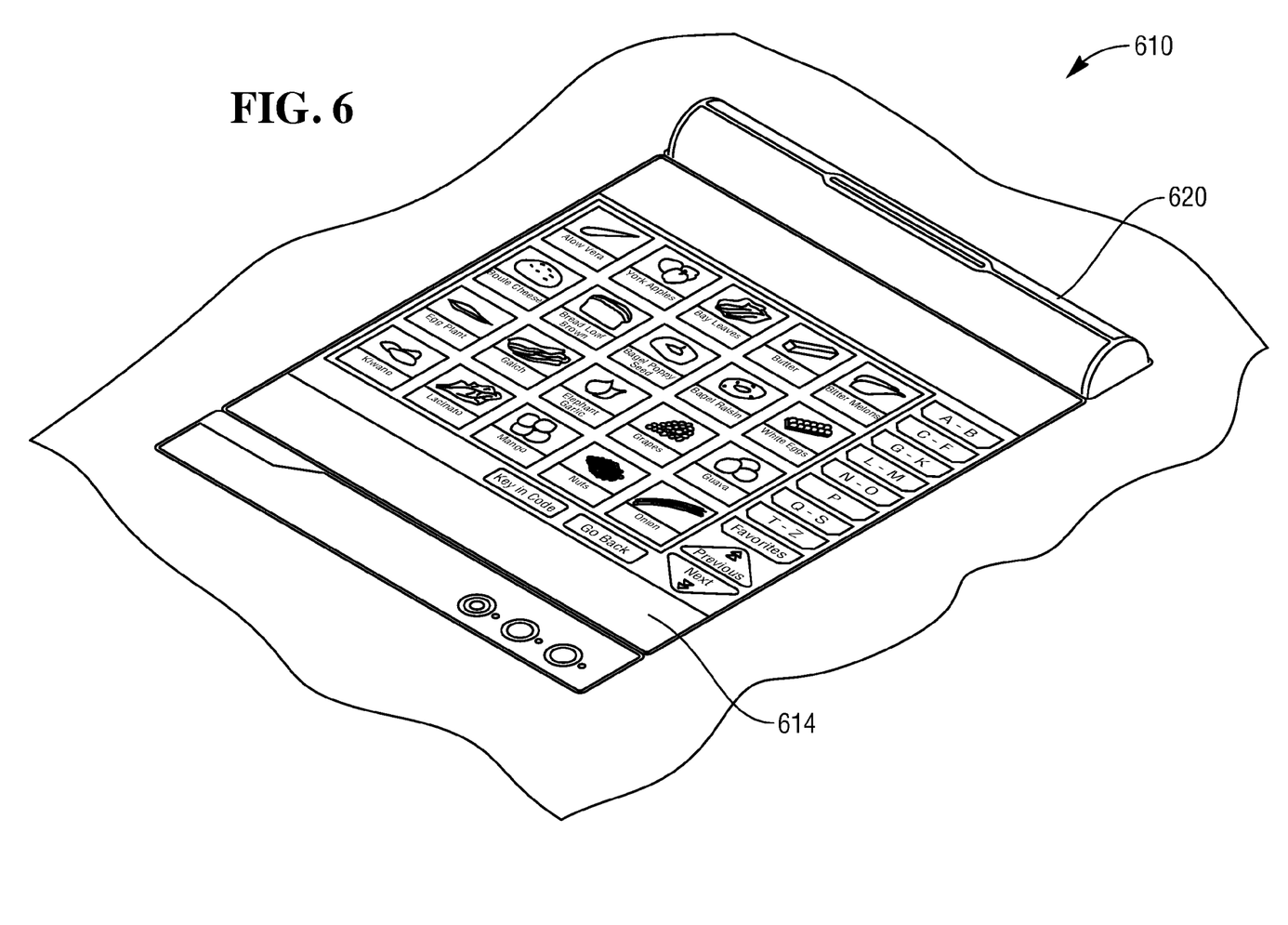
FIG. 6 shows an alternative embodiment of a self-checkout system employing a scanner, scale, touchscreen display, and printer in accordance with the present invention.

FIG. 6 shows an alternative embodiment of an integrated display scanner 610 in accordance with the present invention which further incorporates a printer 620 in the integrated display scanner 610. Utilizing this approach, the separate receipt printers of FIG. 1 and FIG. 2 may advantageously be eliminated and the look and feel of the checkout station 100 and self checkout station 200 can be streamlined. The embodiment of FIG. 6 may be readily incorporated into a self-checkout system, such as system 200 of FIG. 2. The utilization of the integrated display scanner 610 employed in a system like the one in FIG. 2 may allow elimination of a display, like display 220.

Figure 7:
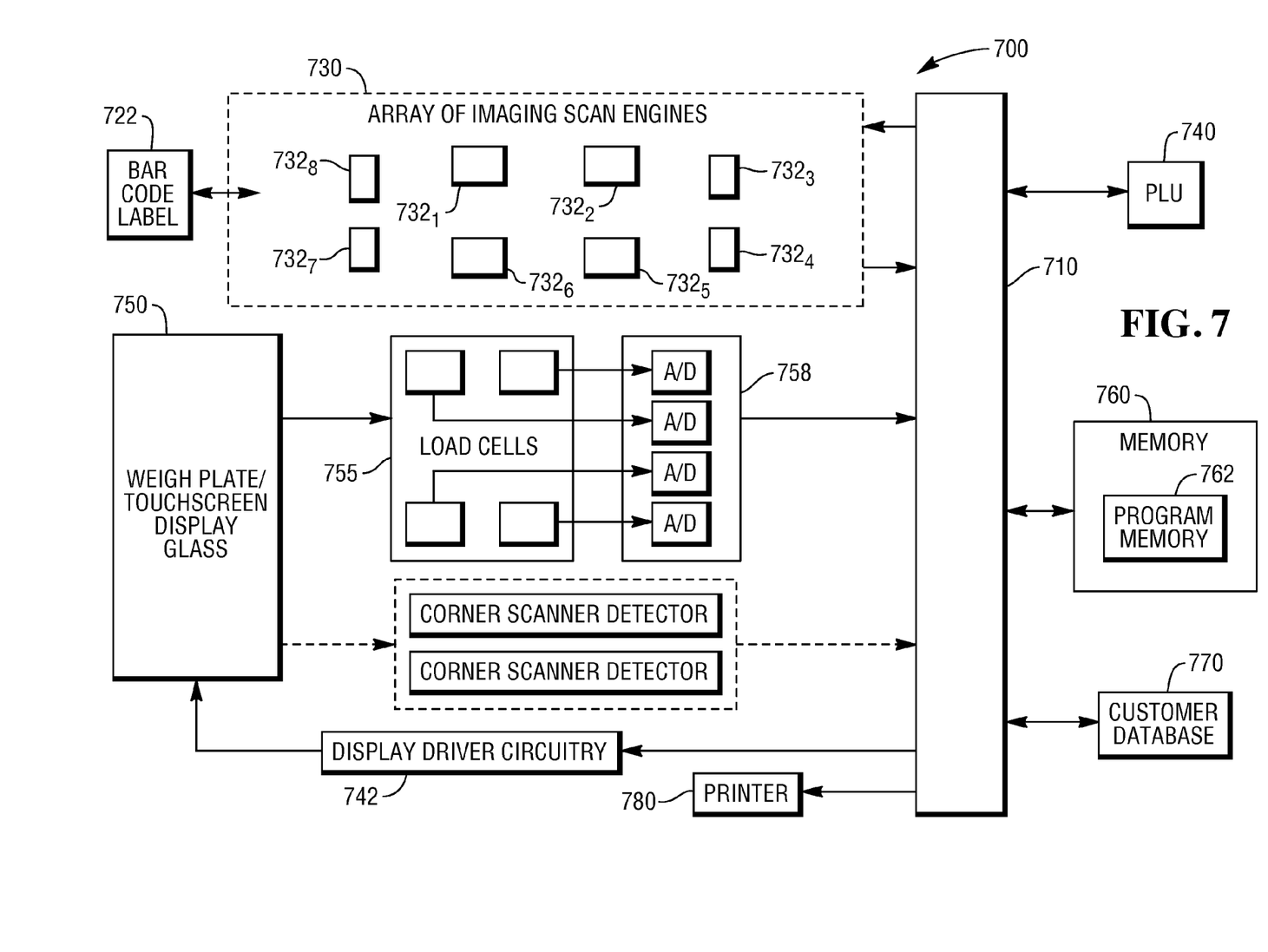
FIG. 7 shows a block diagram of a control circuit for controlling a checkout stand in accordance with the present invention.

FIG. 7 shows a programmed processor control circuit 700 suitable for use in conjunction with either of the integrated display scanner 310 or the integrated display scanner 610 of the present invention. The processor 710 provides control signals to and receives data input signals from a bar code scanner 720 comprising an array of imaging scan engines as further discussed in connection with FIG. 4B. Bar code scanner 720 may suitably be part of the integrated display scanner 310 or 610, respectively. Scanner 720 scans a bar code on a bar code label 722. One or more of the imaging scan engines pick up an image of the bar code on the bar code label 722 as that label is presented in the scan field of the scanner 720.

The processor 710 decodes the data from the image thereby decoding the bar code on bar code label 722 and performs a price look-up in a price look-up table 740. Further details of imaging bar code scanning are addressed in U.S. Patent Application Publication No. 2011/0073656, for example, which is incorporated by reference in its entirety. The price of the scanned item may be output from processor 710 to display driver circuitry 742 which drives the customer portion of the display of weigh plate/touchscreen display 750.

In a first approach in accordance with the embodiment of FIG. 4, a touch or touches of the weigh plate/touchscreen display 750 are detected by load cells 755 whose signals are digitized by analog-to-digital converters 758 whose outputs are processed by the processor 710 based on control program instructions from program memory 762 which is a part of larger storage memory 760. Software for touch detection can also be employed to resolve multiple simultaneous touches, as when the customer and checker are both using portions of the touchscreen display simultaneously.

In a second approach in accordance with the embodiment of FIG. 5, when a touch or touches of the weigh plate/touchscreen display 750 are detected by corner scanner detector 756, the output of those detectors are provided to processor 710 and processed thereby.

Processor 710 may also retrieve customer messages, promotions, advertisements or the like from a customer database 770 which is employed to drive weigh plate/touchscreen display 750 to display a customer message. Data about the customer entered using weigh plate/touchscreen 750 may be stored by the processor in customer database 770, as can customer loyalty points, rewards, transaction data and the like.

Upon completion of the processing of the customer's items, processor 710 may drive a printer 780 to print the customer's receipt, coupons for another shopping visit, and the like. In an embodiment like the embodiment of FIG. 6, printer 780 is integrated into an integrated touchscreen scanner, such as the integrated touchscreen scanner 610.

Figure 8:
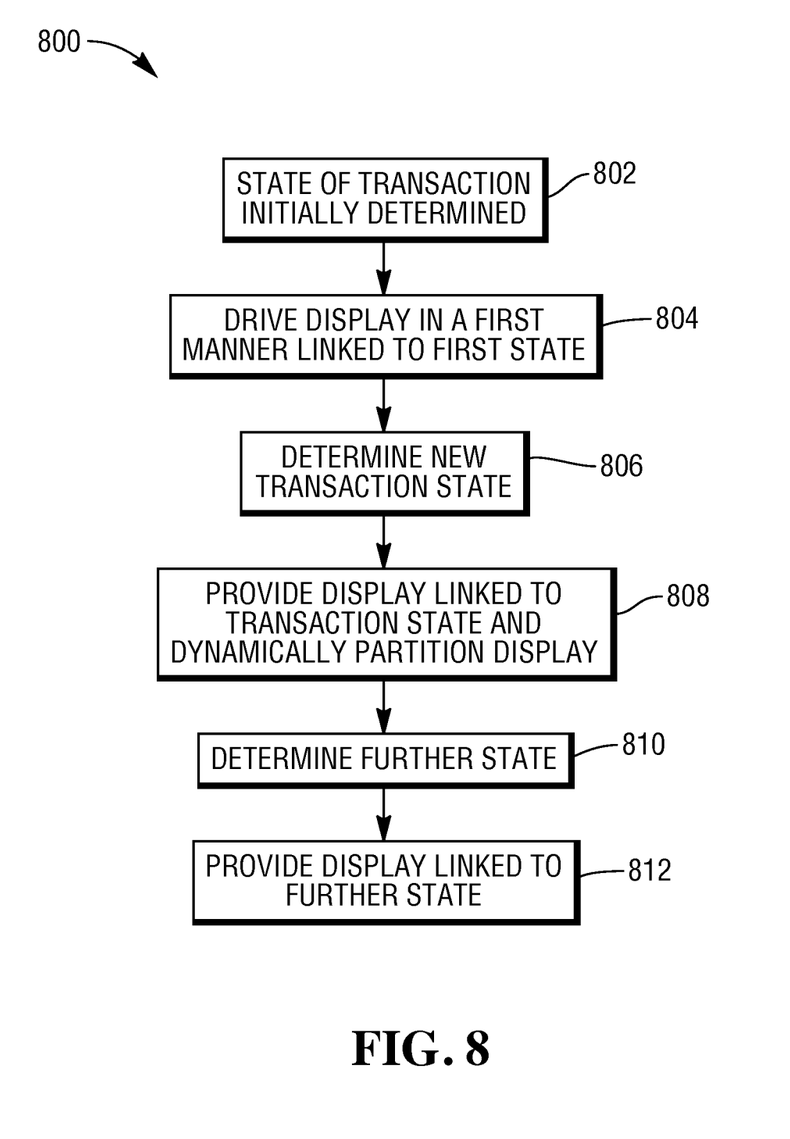
FIG. 8 shows a checkout process in accordance with an embodiment of the invention.

FIG. 8 shows a process 800 of operating an integrated display scanner, such as the integrated display scanner 310 to dynamically partition the display. In step 802, the stage or state of the transaction or use of the integrated display scanner is detected or determined. If the state is an idle state, in step 804, the touchscreen display is driven in a first manner. For example, a display, such as the touchscreen display 314 may be blanked, may display a sequence of promotional or advertising material to possibly catch a customer's eye, or may have a standby display awaiting the next customer to checkout.

In step 806, a new transaction state is detected. For example, the checker may hit a start key or the integrated display scanner may simply detect that an item is being scanned. In step 808, as a result, the touchscreen display 314 may provide a first display like that in FIG. 3 to facilitate checking of produce and the like, as an example. This first display is preferably linked to the state or stage of the transaction. Thus, the display may be designated as a first transaction state display.

As the transaction shifts to a further state, the change is detected in step 810 and the display is dynamically adapted to the second state of the transaction in step 812. As a first example, in the first state, such as the beginning of checking out a customer, the entire display 310 might be utilized by the checker, in a second state, in the middle of a checkout, the display might be partitioned between the checker and the customer, and in a third state, such as when the customer is paying for the order, the entire display might be utilized to display material to the customer to assist the customer in making payment. By tracking the state of the transaction, for example utilizing an appropriately programmed processor, such as the processor 700 of FIG. 7, the display can be dynamically partitioned to maximize its usefulness.

While the present invention has been disclosed primarily in the context of a retail store, consistent with the claims which follow, it will be recognized that the invention may be suitably applied to a wide range of other environments. Further, while examples of a preferred glass approach, several touch detection arrangements, and an exemplary scanning arrangement are addressed herein, it will be recognized many changes or additions may be made in components and control as technology evolves and various technologies become cost effective and improve.

We claim:

1. An integrated scanner, scale and touchscreen display comprising:
   a bar code scanner;
   a weigh scale;
   a touchscreen display comprising both a display and a touch screen, wherein the touch screen is partitioned into a first partition for a customer and a second partition for a checkout operator of the integrated scanner, and software adapted for touch processing coupled to the touchscreen display and adapted to permit the customer to access the first partition and the checkout operator accesses the second partition, and wherein the barcode scanner, the weigh scale, and the touchscreen display are integrated with one another as an integrated device, wherein a glass weigh plate of the weigh scale is configured to receive items for weighing and to receive first touches from the customer in the first partition of the touch screen and second touches from the checkout operator in the second partition of the touch screen, and wherein the glass weigh plate is adapted to be removed and replaced when the glass weigh plate is scratched, and wherein the glass weigh plate does not include a diamond coating and does not include a sapphire layer, and wherein the touch screen display is arranged beneath the weigh plate and the barcode scanner is situated beneath the weigh plate and the touchscreen display along an edge and arranged not to be blocked by the touchscreen display; and
   control electronics for processing bar code scanner output data; weigh scale output data, inputs from the touchscreen display, and during the display.

2. The integrated scanner, scale and touchscreen display of claim 1 wherein the weigh scale comprises the glass weigh plate, and a plurality of load cells which detect both weight of an item placed on the weigh scale to be weighed, as well as location of a touch upon the touch input.

3. The integrated scanner, scale and touchscreen of claim 1 wherein the weigh scale comprises the glass weigh plate, and a plurality of load cells which detect weight of an item placed on the weigh scale to be weighed, and the touch input further comprises a detector arrangement mounted at the edges of the glass weigh plate to detect location of a touch upon the touch input.

4. The integrated scanner, scale and touchscreen display of claim 1 further comprising a common housing designed to facilitate mounting a top surface of the integrated scanner, scale and touchscreen display substantially flush with a top surface of a checkout stand.

5. The integrated scanner, scale and touchscreen display of claim 1 wherein the control electronics further comprises a programmed processor for driving the display of the touchscreen display to permit access to both the first partition and second partition of the partitioned touch screen.

6. The integrated scanner, scale and touchscreen display of claim 5 wherein the programmed processor controls dynamically partitioning of the display, said partitioning linked to a state of a checkout transaction.

7. The integrated scanner, scale and touchscreen display of claim 1 further comprising:
   a printer integrated thereinto.

8. The integrated scanner, scale and touchscreen display of claim 1 further comprising:
   a point of sale terminal integrated thereinto.

9. The integrated scanner, scale and touchscreen display of claim 8 wherein when a checker is weighing an item of produce, a menu of produce icons is displayed on the display.

10. The integrated scanner, scale and touchscreen display of claim 3 which the detector arrangement provides data which is analyzed by the control electronics as part of a produce recognition routine.

11. The integrated scanner, scale and touchscreen display of claim 1 wherein the bar code scanner employs an array of image scanners arranged around a periphery of the weigh plate glass of the weigh scale.

12. The integrated scanner, scale and touchscreen display of claim 11 wherein outputs from the array of image scanners are analyzed to detect an attempted fraud where an item having a bar code is passed around and not over the bar code scanner.

* * * * *